March 30, 1948.  F. F. STANGE  2,438,722
YARN WINDING MACHINE
Filed Jan. 16, 1945  10 Sheets-Sheet 1

INVENTOR.
Ferdinand F. Stange
BY
ATTORNEY

March 30, 1948. F. F. STANGE 2,438,722
YARN WINDING MACHINE
Filed Jan. 16, 1945 10 Sheets-Sheet 2

INVENTOR.
Ferdinand F. Stange.
BY
Hobart N. Durham
ATTORNEY

March 30, 1948.  F. F. STANGE  2,438,722
YARN WINDING MACHINE
Filed Jan. 16, 1945  10 Sheets-Sheet 3
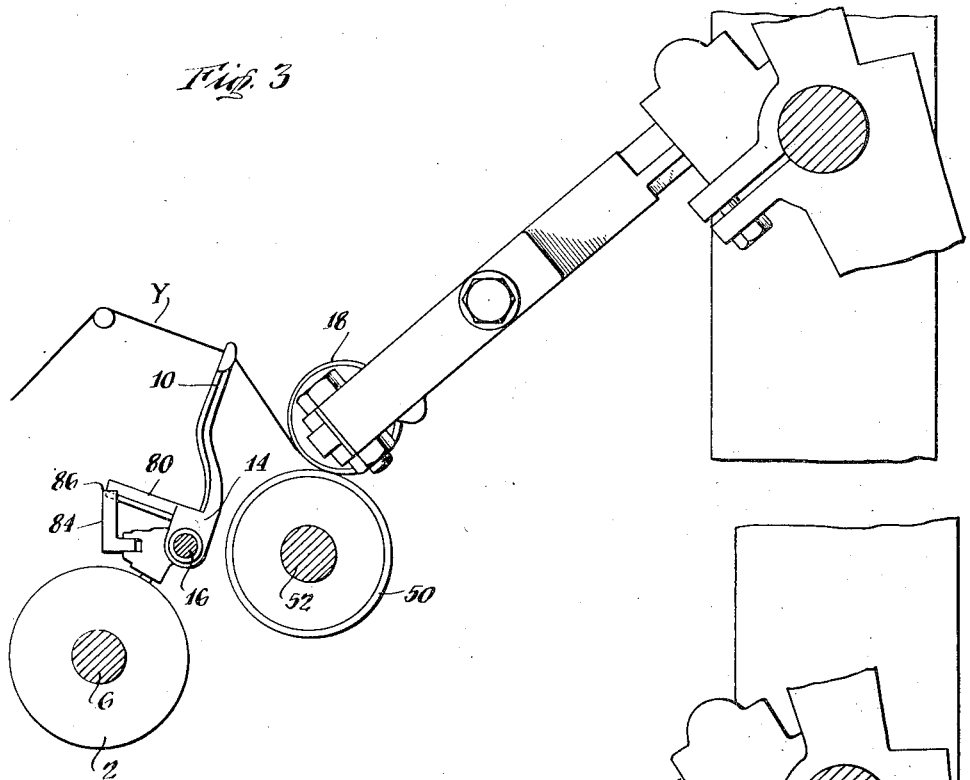
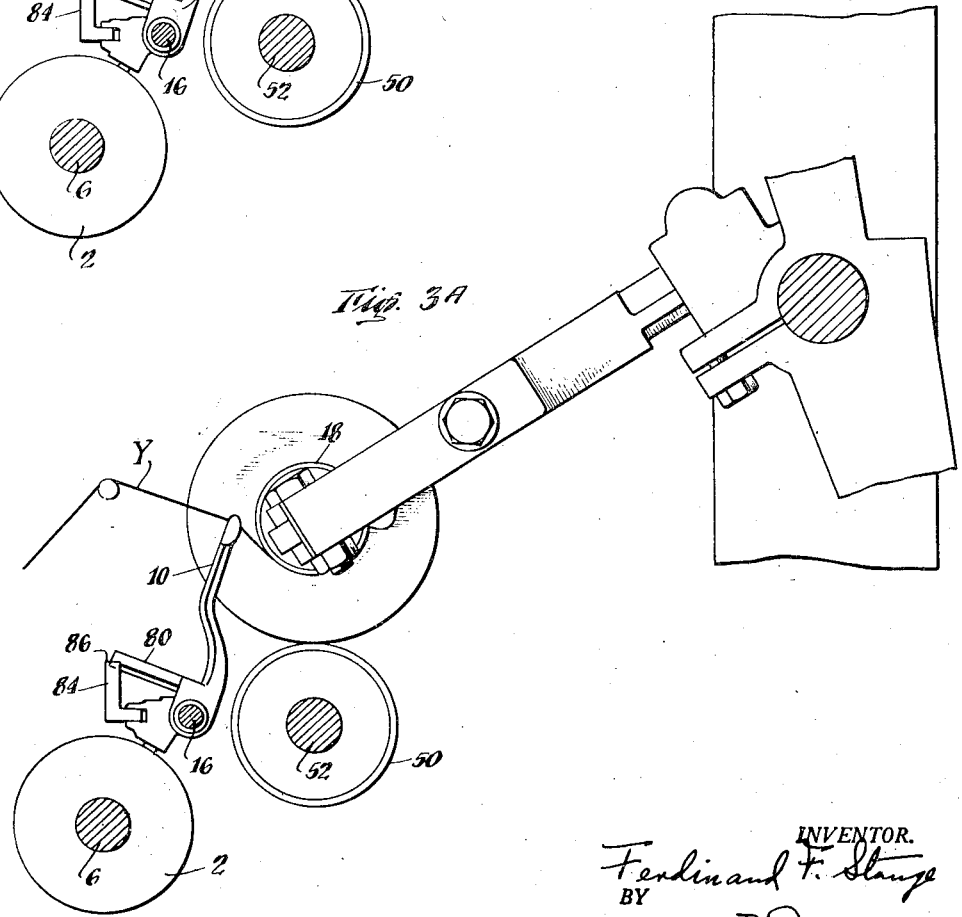
INVENTOR.
Ferdinand F. Stange
BY
Herbert N. Dunham
ATTORNEY

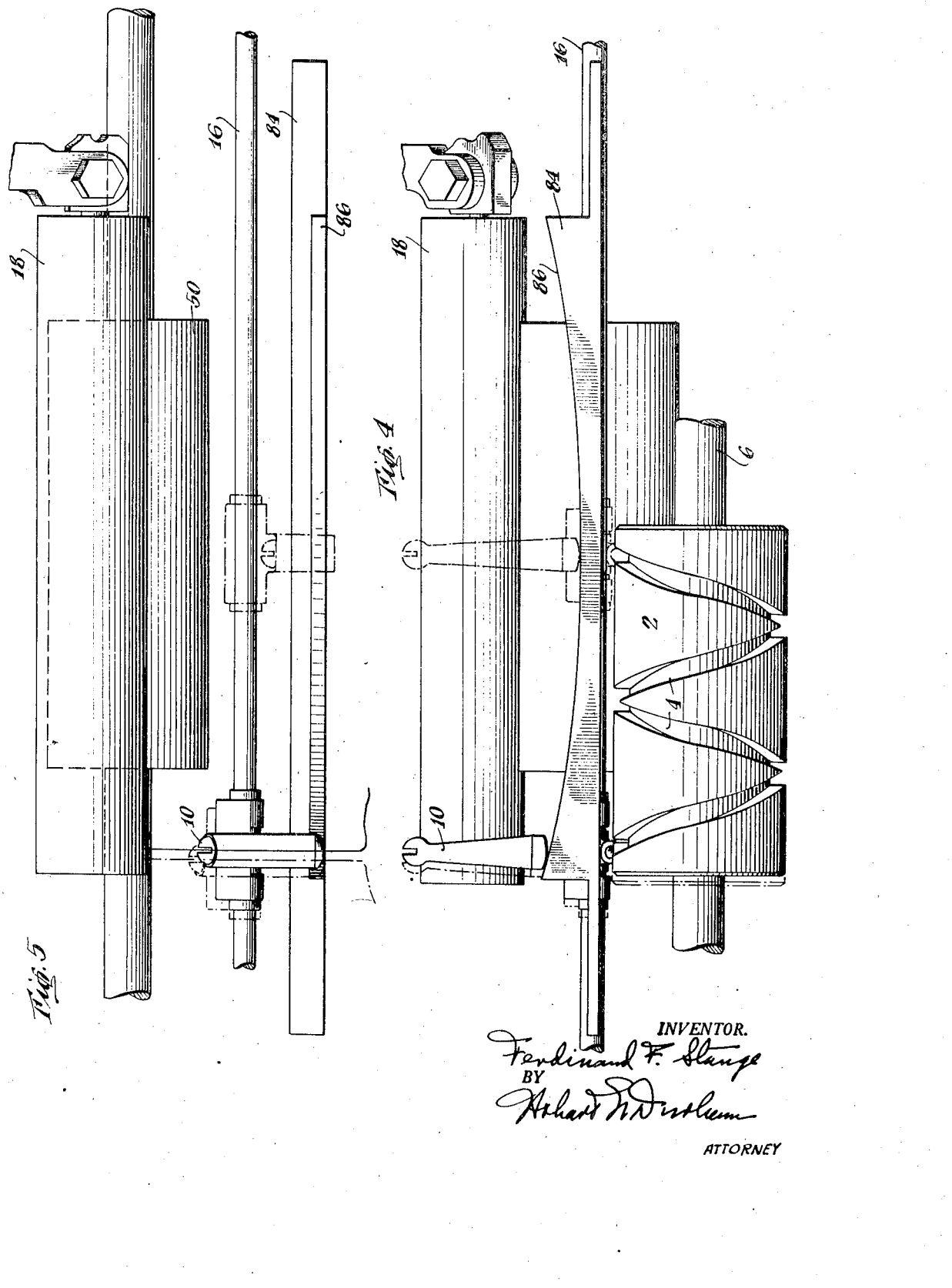

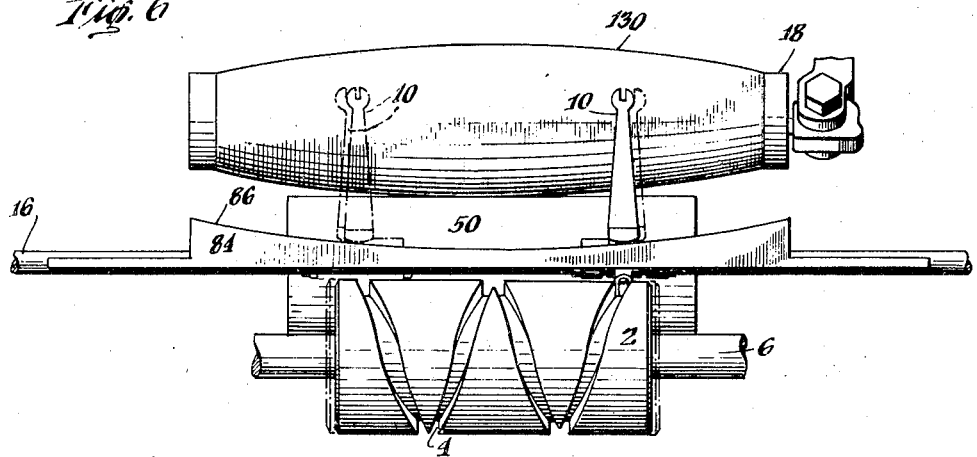
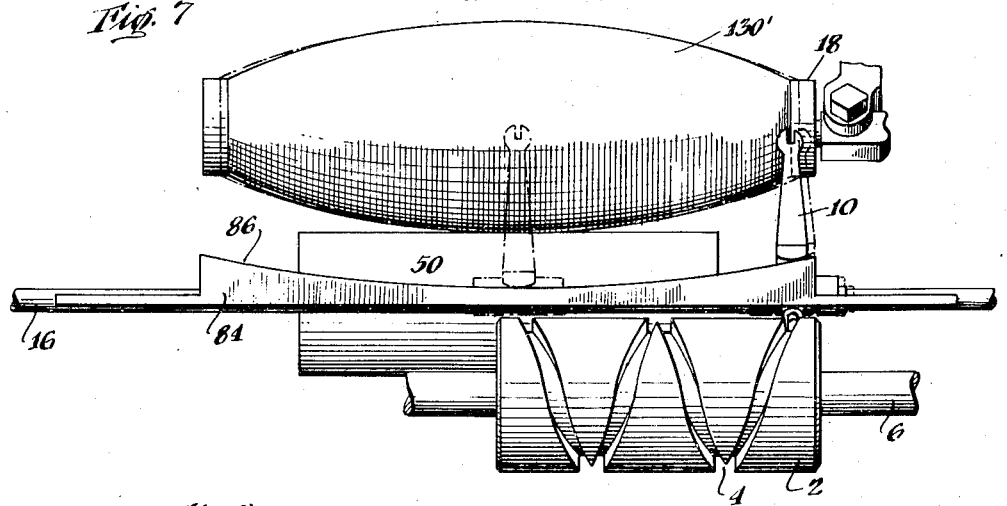
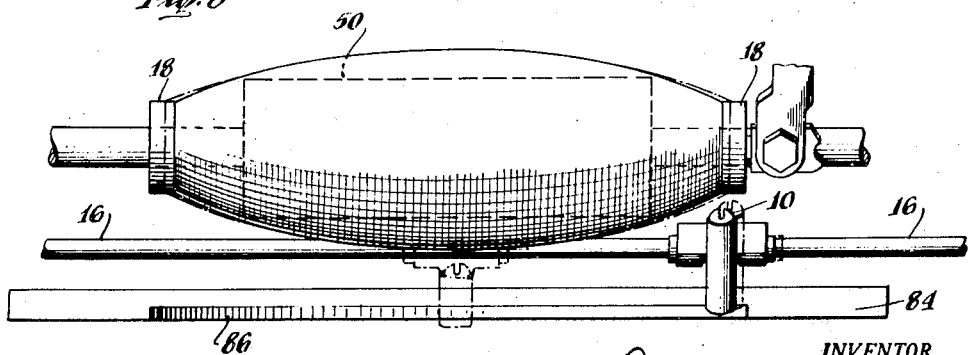

March 30, 1948. F. F. STANGE 2,438,722
YARN WINDING MACHINE
Filed Jan. 16, 1945 10 Sheets-Sheet 6

INVENTOR.
Ferdinand F. Stange
BY
ATTORNEY

March 30, 1948.　　F. F. STANGE　　2,438,722
YARN WINDING MACHINE
Filed Jan. 16, 1945　　10 Sheets-Sheet 7
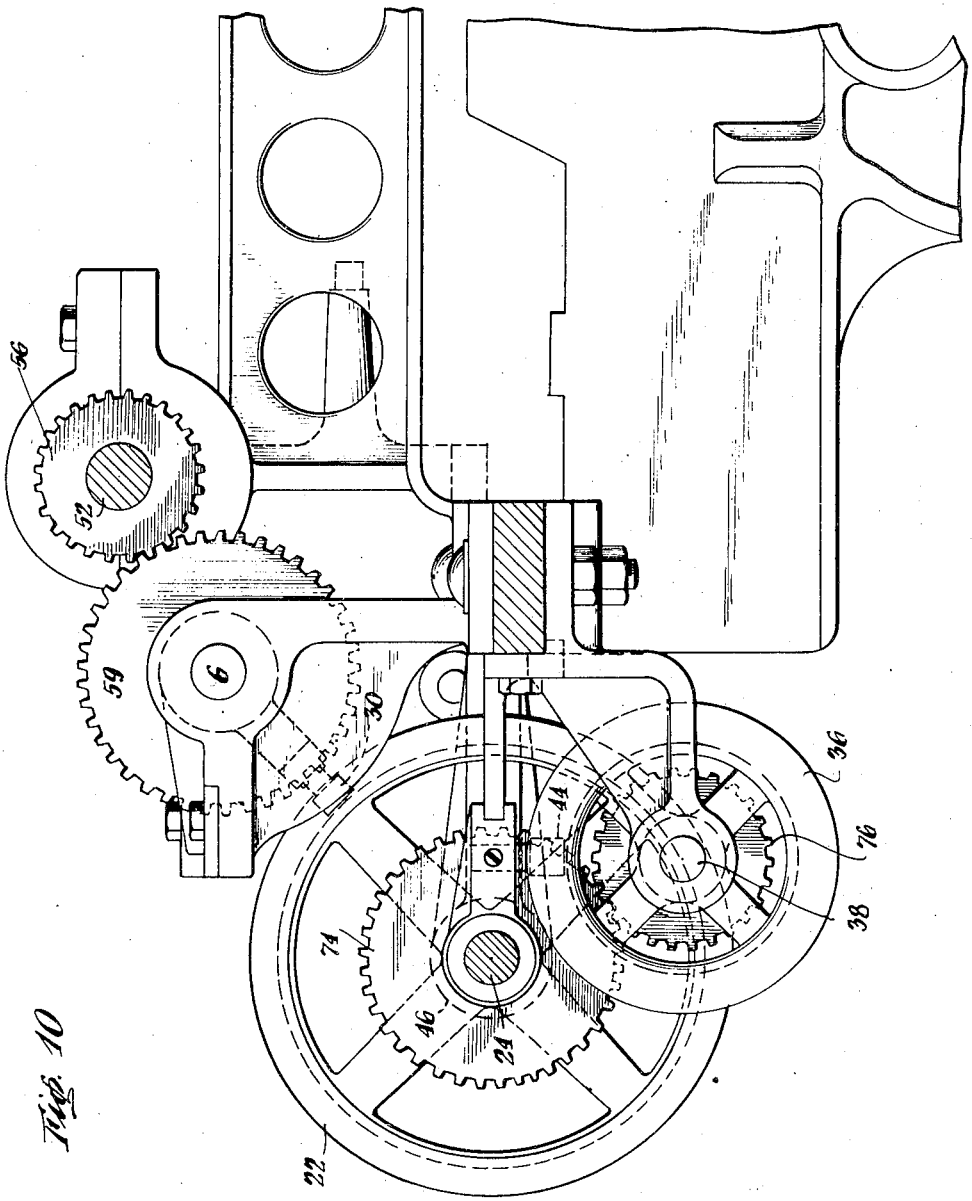

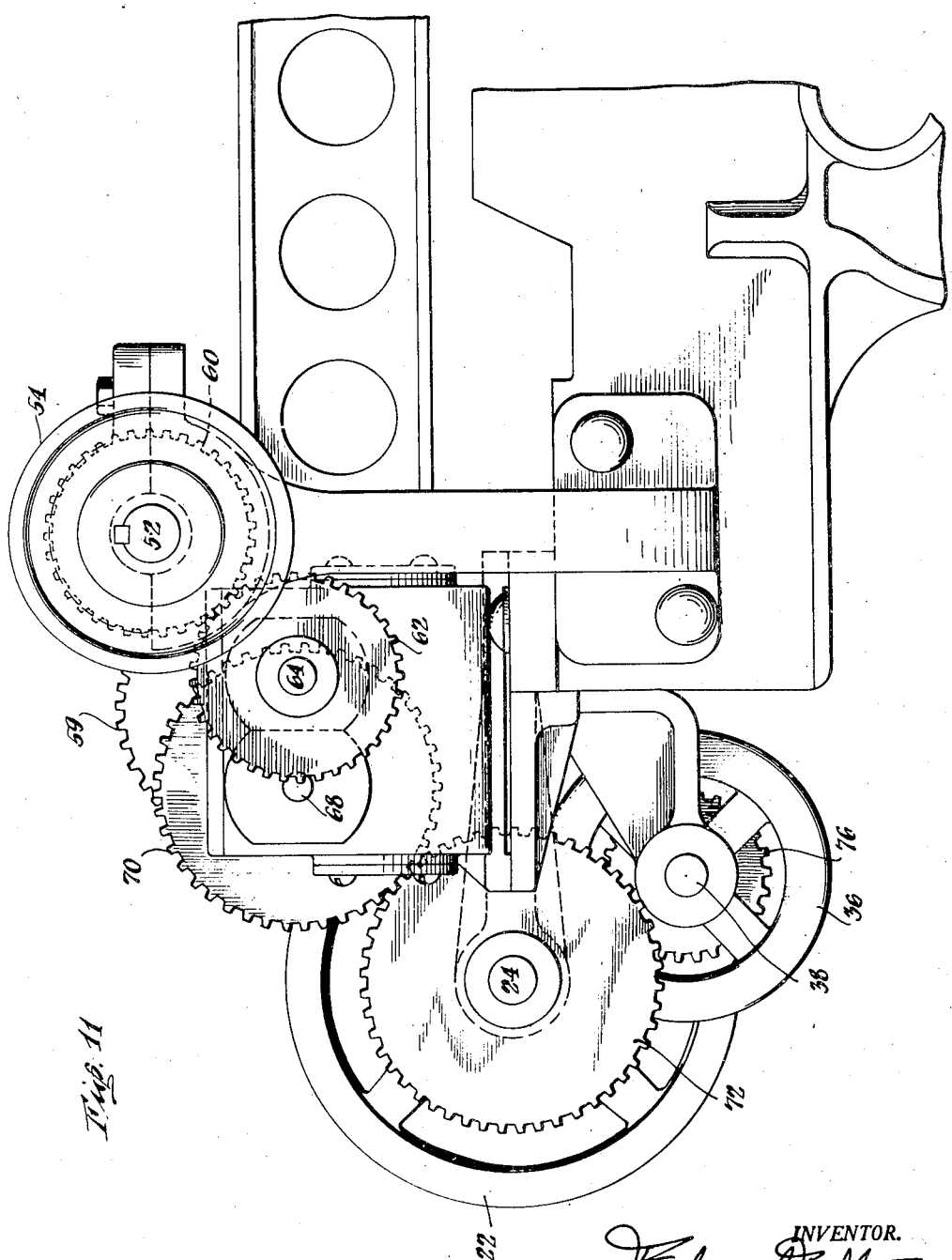

March 30, 1948.  F. F. STANGE  2,438,722
YARN WINDING MACHINE
Filed Jan. 16, 1945  10 Sheets-Sheet 9
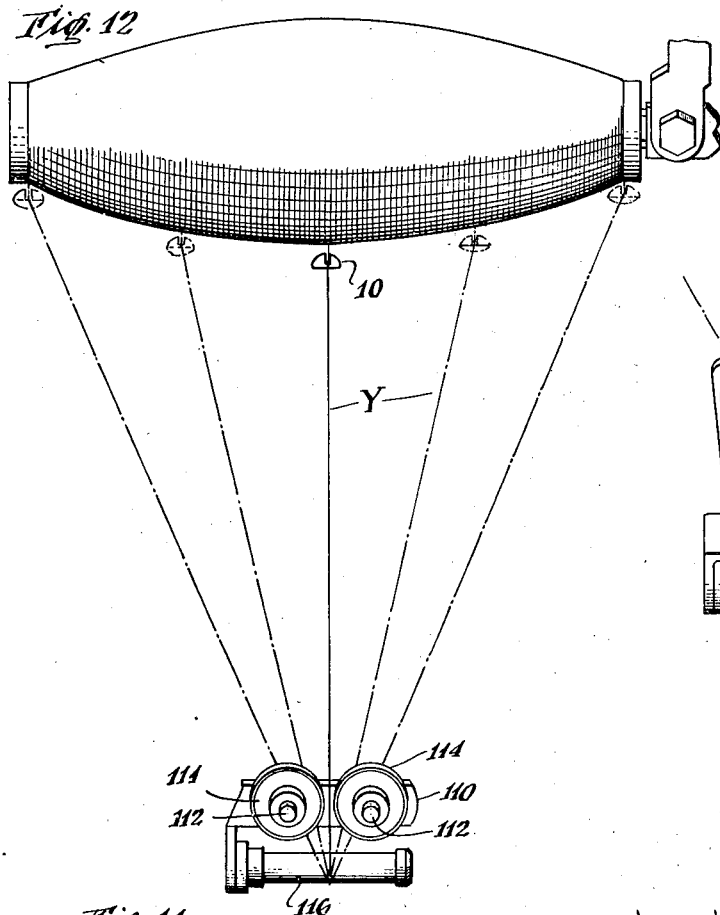
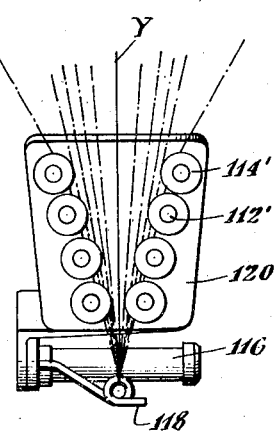
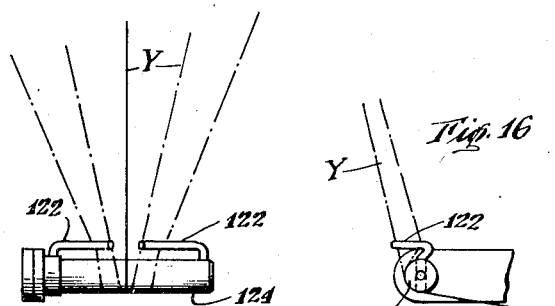
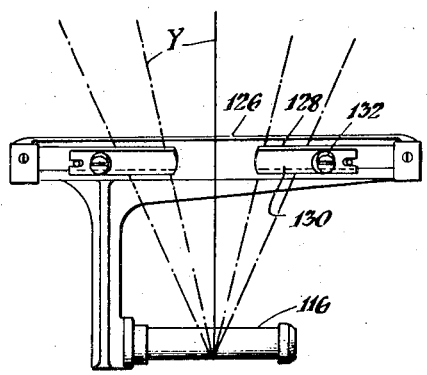
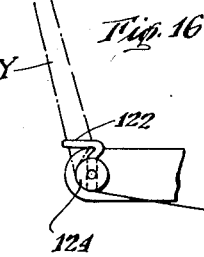
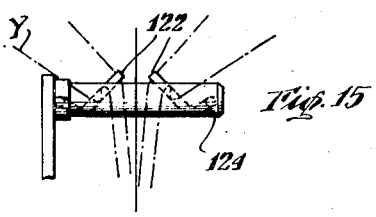

March 30, 1948.  F. F. STANGE  2,438,722
YARN WINDING MACHINE
Filed Jan. 16, 1945  10 Sheets-Sheet 10

INVENTOR.
Ferdinand F. Stange
BY
Robert N. Dunham
ATTORNEY

Patented Mar. 30, 1948

2,438,722

UNITED STATES PATENT OFFICE 2,438,722

YARN WINDING MACHINE

Ferdinand F. Stange, Westfield, Mass., assignor to Foster Machine Company, Westfield, Mass., a corporation of Massachusetts Application January 16, 1945, Serial No. 573,061

37 Claims. (Cl. 242—43)

This invention is a machine for winding yarn and includes, in addition to the machine itself, a new type of yarn package, produced by the machine, and a new method of winding, involved in the operation of the machine.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

In the drawings:

Figure 3 is a side view, partly in section, showing the yarn guide and cooperating parts, at the start of the winding operation;

Figure 3A is a view similar to Figure 3, at the end of the winding operation;

Figure 4 is a fragmentary front elevation, showing the primary traverse cam and associated parts, at the start of the winding operation;

Figure 5 is a plan view of the parts of Figure 4;

Figure 6 is a fragmentary front elevation, like Figure 4, showing a package partly wound;

Figure 7 is a fragmentary front elevation, like Figure 4, showing a fully wound package;

Figure 8 is a plan view of the parts of Figure 7;

Figure 10 is a section on line 10—10 of Figure 9;

Figure 11 is an end view of the parts shown in Figure 9, looking to the left;

Figure 12 is a diagrammatic view, showing one form of tension applying means;

Figure 13 is a plan view showing another form of tension applying means;

Figure 18:
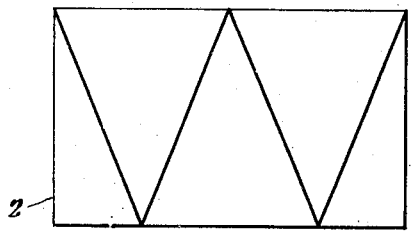
Figure 21:
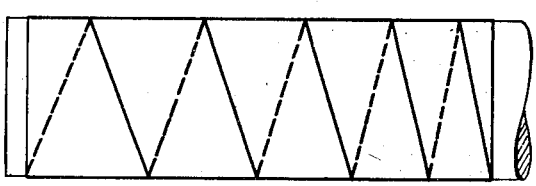
Figure 19:
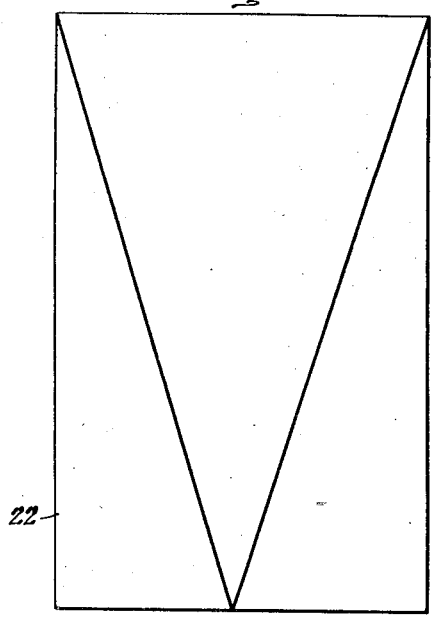
Figure 22:
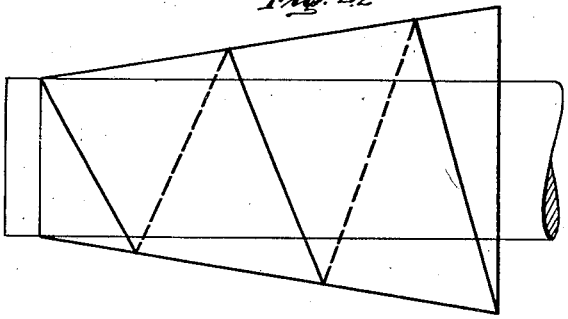
Figure 23:
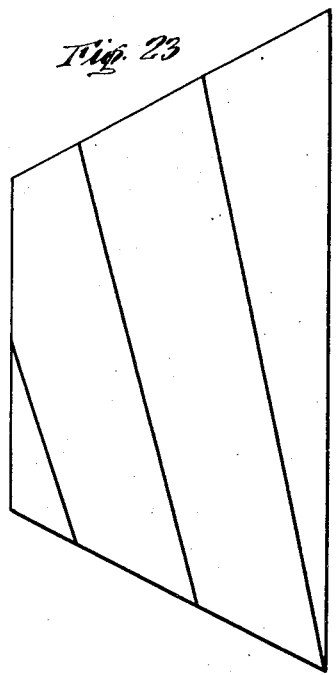
Figure 20:

Figures 14, 15, and 16 are plan, front and end views of still another form of tension applying means;

Figure 17 is a plan view of still another form of tension applying means;

Figure 18 is a diagram showing the traverse of the primary cam;

Figure 19 is a diagram showing the traverse of the first auxiliary cam;

Figure 20 is a diagram showing the traverse of the second auxiliary cam;

Figures 21, 22, and 23 are diagrammatic views showing the angular lay of the yarn on different cores.

The principal objects of the invention are:

1. To provide a yarn winding machine having a yarn guide having a traverse stroke less than the overall length of the package; in addition, certain increments and decrements are successively superposed on the traverse stroke, so that the yarn is wound over an area greater than its traverse stroke.

2. To provide a yarn winding machine wherein a short traverse cam for the yarn guide is bodily shifted under control of two other cooperating auxiliary cams.

3. To provide a control for the yarn guides which gives a successive increase of angular lay of the coils, reading from the middle of the package toward both ends.

4. To provide a control for the yarn guide which gives a successive increase of angular lay of the coils, reading from the middle of the package toward both ends, which increase of angular lay varies at different depths in the package.

5. To provide a control for the yarn guide which progressively increases the drag or tension applied to the running yarn (as distinguished from the tension of the yarn in the wound package) as it is wound toward the ends of the package, and simultaneously increases the angularity of lay between successive coils.

6. To provide a yarn guide which moves toward the axis of the package as it moves toward the ends of the package, which keep the lash or distance from the yarn guide to the surface of the package, nearly uniform.

7. To provide a yarn winding machine which forms a package with tapered ends, in which the diameter and length of the package increase simultaneously during the winding, and which forms coils in which the angle of lay of the coils increases progressively from the middle of the package toward each end, and in which progressively greater drag is applied to the yarn as the yarn guide approaches the end of its traverse stroke, thereby maintaining a substantially uniform tension in all of the wound coils.

8. To produce a yarn package wherein the angularity of lay of the coils successively increases towards the ends of the package and wherein the drag on the yarn also successively increases towards the ends of the package.

9. To produce a yarn package particularly for such yarns as "Nylon," wherein the bothersome loops that tend to form at the ends of the package are secured and held in place by the end coils.

10. To produce a yarn package having a slight taper at both ends, particularly for "nylon," wherein the yarn strand will unwind freely, with a "ballooning" effect, and without catching.

11. To produce a yarn package, with a slight taper at both ends, having a shape approximately that of a double truncated ellipsoid of revolution, wherein the innermost or first-laid coils have an angle of lay which gradually increases from the middle of the package toward both ends, wherein the outermost or last-laid coils have an angle of lay at the middle greater than the angle of lay of the middle of the inner coils, the angle or lay of the outer coils also increasing from the middle of the package toward the ends.

12. To provide a yarn package, tapered to a thin edge at each end, in which, during the winding, the diameter and length of the package simultaneously increase.

13. To provide a yarn package wherein the "ribbon-wind" effect is avoided by providing a cycle for the yarn guide longer than the winding time for the package.

14. To produce a yarn package wherein the angularity of lay of the coils increases towards the ends of the package, the amount of such increase, however, varying at different depths in the package.

With the above objects in view the winding machine comprises a yarn guide controlled by a traverse cam having an endless cam groove which has a traverse stroke less than the overall length of the package. This traverse cam is movable bodily back and forth parallel to the axis of the package, thereby increasing the effective length of its traverse stroke. This bodily movement of the traverse cam is effected by a first auxiliary cam having an endless groove operatively engageable with the shaft that carries the traverse cam; the first auxiliary cam, however, is itself moved bodily back and forth by means of a second auxiliary cam which is operatively engaged with the shaft on which the first auxiliary cam is mounted.

The three cams just described are intergeared for simultaneous rotary operation so as to give the yarn guide controlled by the traverse cam a cycle of movement longer than the time required to wind one package, the result of which is that there is no repetition of the cycle in one package and therefore no "ribbon wind."

In order to keep the lineal speed of the yarn as it is fed to the package nearly constant, the core and package are rotated by a peripheral driving roll which contacts against the surface of the package as it builds up, this driving roll being intergeared with the control cams and so its peripheral speed is constant as compared with the speed of the cams.

A fixed guide cam or forming plate is provided for the yarn guide, which rocks the yarn guide back and forth toward and away from the surface of the package, moving the yarn guide closer to the package as the guide approaches the end of its traverse stroke and moving it away from the axis of the package as it moves toward the middle thereof. As the package builds up, its diameter gradually increases to build up a package shaped like a double truncated ellipsoid or approximate barrel shape, with tapered ends, and so the yarn guide toward the end of the winding operation follows an approximately curved path which is about parallel to the surface of the finished package.

As the yarn guide approaches either end of its traverse stroke it is subjected to gradually increasing drag, an important feature particularly in the case of winding "nylon" which tends to make loops at the end of the traverse stroke. With the present invention, even if these loops should form, they are firmly held in place by the increased tension applied toward the ends of the package so that they are firmly held and unwind without any difficulty.

Referring now to these drawings in which similar reference characters indicate similar parts, 2 indicates the primary rotary traverse cam, provided with an endless cam groove 4 and mounted on shaft 6, and turning in and longitudinally movable in bearings 8.

Yarn guide 10 has a hub portion 11 slidably and pivotally mounted on traverse rod 12. Hub 11 is positioned between arms 13 of primary guide 14, said guide having a follower 15 engageable in cam groove 4 of the primary cam. A secondary guide 16 in the form of a sleeve slotted at 17 slidable on traverse rod 12 engages with opposite sides of hub 11 and primary guide 14 for guiding their movement along the traverse rod 12. With this construction, guide 10 is slidable on rod 12, and can also rock back and forth on rod 12.

The yarn guide 10 supplies yarn Y to the empty core 18 mounted on a spindle carried by the yoke arm 20.

Coming now to the first auxiliary cam 22, this cam is a rotary cam and is secured to shaft 24, which shaft in turn is slidably mounted in and is longitudinally movable in bearings 26.

The cam groove 28 of this cam engages with the follower 30 fixed to the traverse cam shaft 6, through the medium of a shifting bar 32 and lock collar 34. It is evident that cam 22 will move traverse cam 2 back and forth bodily in a direction substantially parallel to the axis of the package.

The second auxiliary cam 36 is a rotary cam and has a relatively smaller traverse; it is mounted on shaft 38 mounted in bearings 40. The endless cam groove 42 of this cam engages with a follower 44 secured to auxiliary cam shaft 24 through the medium of a cam shaft shifting bar 46 and lock collar 48.

It is evident that the second auxiliary cam will at times increase the throw of the first auxiliary cam and at other times will decrease its throw so that certain increments and decrements will be imposed on the action of the primary cam 2 as will be discussed more fully below.

The empty core, and the package as it builds up, is driven at a substantially constant peripheral speed (measured at the mid portion of the package) by the drive roll 50, carried by the driven shaft 52 and positioned to bear against the surface of the package as it builds up on the core 18.

The cam shafts 6, 24, and 38, and the roll shaft 52, are intergeared for simultaneous operation as will now be described, reference being made particularly to Figures 9, 10, 11 and 1.

Shaft 52 which carries the peripheral drive roll 50 may be considered as the main drive shaft, being driven by sheave 54. Shaft 52 carries a long spur gear 56, which meshes with spur gears 58 and 59, which latter gears are secured to the shaft 6 of the traverse cam 2 and so drive the traverse cam so that at least one of said gears 58 or 59 is always in mesh with the driving gear 56, as the shaft 6 is moved back and forth.

Shaft 52 is also provided with spur gear 60 which meshes with spur gear 62 on shaft 64 of a reduction gear 66, such, for example, as a "Boston" gear reducer, which may conveniently have a reduction ratio of 100 to 1. The low speed shaft 68 from the reduction gear is provided with a spur gear 70 which meshes with spur gear 72 secured to the drive shaft 24 for the first auxiliary cam 22 and so drives this cam. Shaft 24 also carries a spur gear 74 meshing with spur gear 76 on the shaft 38 of the second auxiliary cam 36 and so drives such cam.

All of the foregoing drives, driven from the shaft 52, are intergeared with each other, and so the three cam shafts and the drive shaft 52 for the peripheral drive or the package rotate at predetermined relative rates.

Without restricting the invention to any particular values, the core is preferably about one and one-half to two inches in diameter, the primary traverse cam 2 may have a traverse of about four inches and an overall traverse of about nine inches, the first auxiliary cam 22 a traverse of about four and one-half inches and the second auxiliary cam 36 a traverse of a fraction of an inch.

With the three cams, that is, the traverse cam, the first auxiliary cam and the second auxiliary cam, operating together, the following results are produced:

1. When all three cams are producing movement in the same direction, there is a double increment added to the normal traverse of the traverse cam. This gives the greatest angularity of lay between the helical coils on the package.
2. When the traverse and first auxiliary cams are producing movement in the same direction, and the second auxiliary cam is producing movement in the other direction, there is a single increment added to the traverse of the traverse cam.
3. When the traverse cam is producing movement in one direction and the first and second auxiliary cams are producing movement in the opposite direction, there is a double decrement subtracted from the traverse of the traverse cam. This gives the least angularity of lay between the helical coils on the package.
4. When the traverse cam and second auxiliary cams are producing movement in one direction and the first auxiliary cam is producing movement in the opposite direction, there is a single decrement subtracted from the movement of the traverse cam.

The foregoing relationship of the cams gives a cycle of movement of the traverse cam longer than the winding time for one package, thereby avoiding any recurrence of identical movements of the yarn guide within the winding time for one package, and so avoiding any "ribbon-wind" effect, which results from repetition of the cam cycle.

As will be evident to one skilled in the art, a single set of cams may be used in a multiple winding machine to control a plurality of yarn guides like guide 10, for simultaneously winding several yarn packages.

The yarn guide 10 is moved back and forth on its traverse rod 12 by the traverse cam 2. During such movement the yarn guide is rocked toward and away from the package by the following mechanism: the yarn guide 10 is provided with an integral extension 80, which is pulled by spring 82 to the left, Figure 2, so that this extension 80 rides on the forming guide 84, which is a long fixed member provided with an arcuate contact surface 86 substantially parallel with and coextensive with the package core 18. Primary guide 14 has spaced flanges 87 engageable with edge 84' of guide 84. The surface 86 is nearest the core at its ends and is in the form of a smooth curve bending away from the surface of the package. As the yarn guide 10 moves back and forth on rod 12 it will ride on contact surface 86 and will be rocked toward and away from the surface of the package, so that at the end of the winding operation when the package has built up to the shape shown in Figure 7, the end of the yarn guide is moving in a path substantially parallel to the curved surface of the package.

The yarn guide 84 instead of being provided with an arcuate surface 86 in the form of a smooth curve may have the guide surface 86 in other shapes, such as a very flat V, or in a shape where the middle portion of the guide is flat while the ends curve or extend toward the package. In every such shape, however, the guide surface 86 has both ends nearest the surface of the package, while the middle is furthest away therefrom. With this construction the "lash" or amount of thread extending from the end of the yarn guide to the surface of the package is rendered more nearly uniform than if the yarn guide moved in a straight path.

The package core 18 is supported on a spindle 90, being latched in place by the yoke arm friction spring 91, carried by yoke arm 20 mounted in socket member 94 of the yoke bearing 96. The yoke bearing 96 is provided with a yoke arm 98, to the lower end of which the rack arm 100 is pivotally secured. Rack arm 100 extends forwardly for manual operation by handle 102 and it may be latched in its forward position by the tooth 104 adapted to engage in a suitable notch or notches 106 in the underside of the arm 100. Yoke bearing 96 is provided with a yoke friction spring 107 engageable with collar 108.

Figure 1:
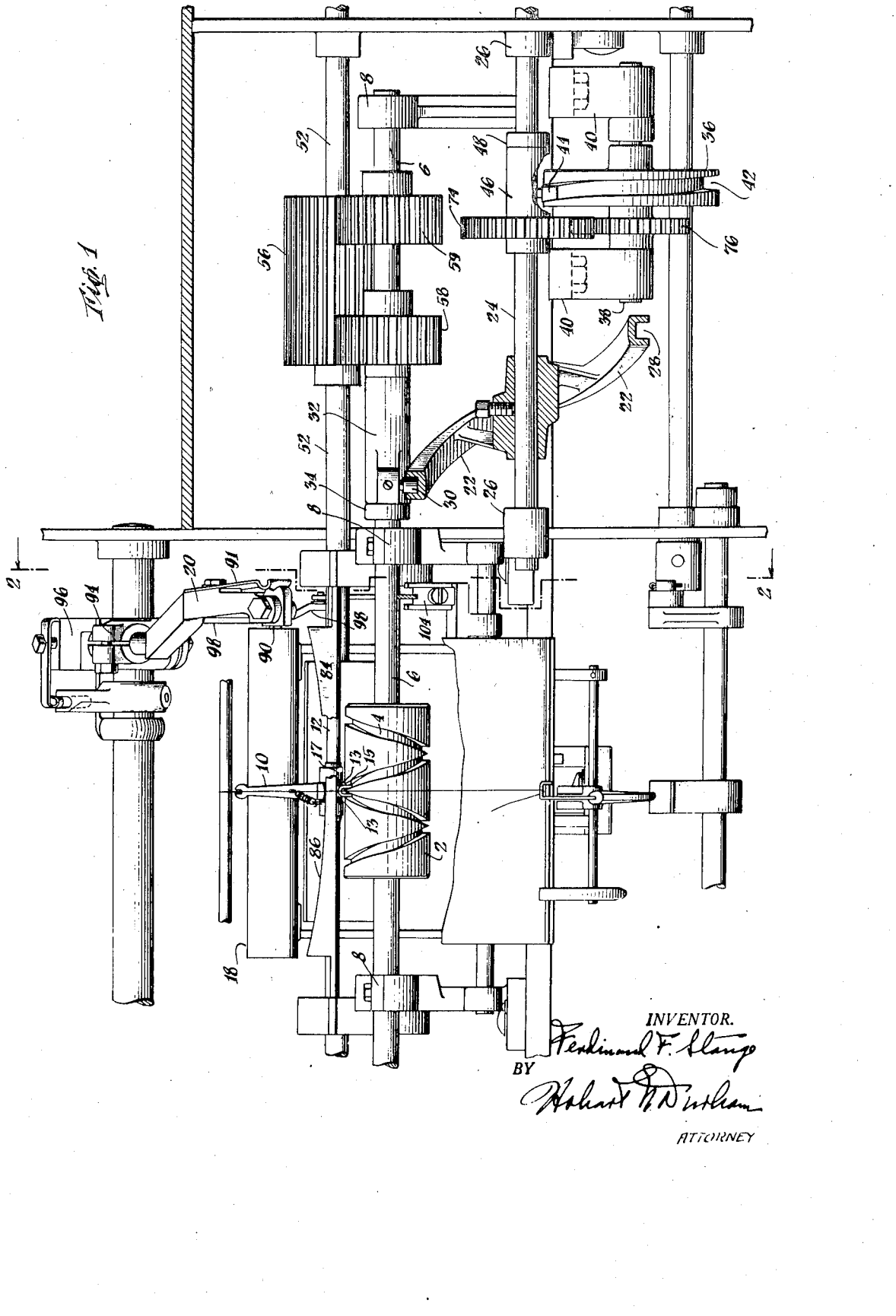
Figure 1 is a side elevation, partly in section, of a portion of a yarn winding machine embodying present invention.
Figure 2:
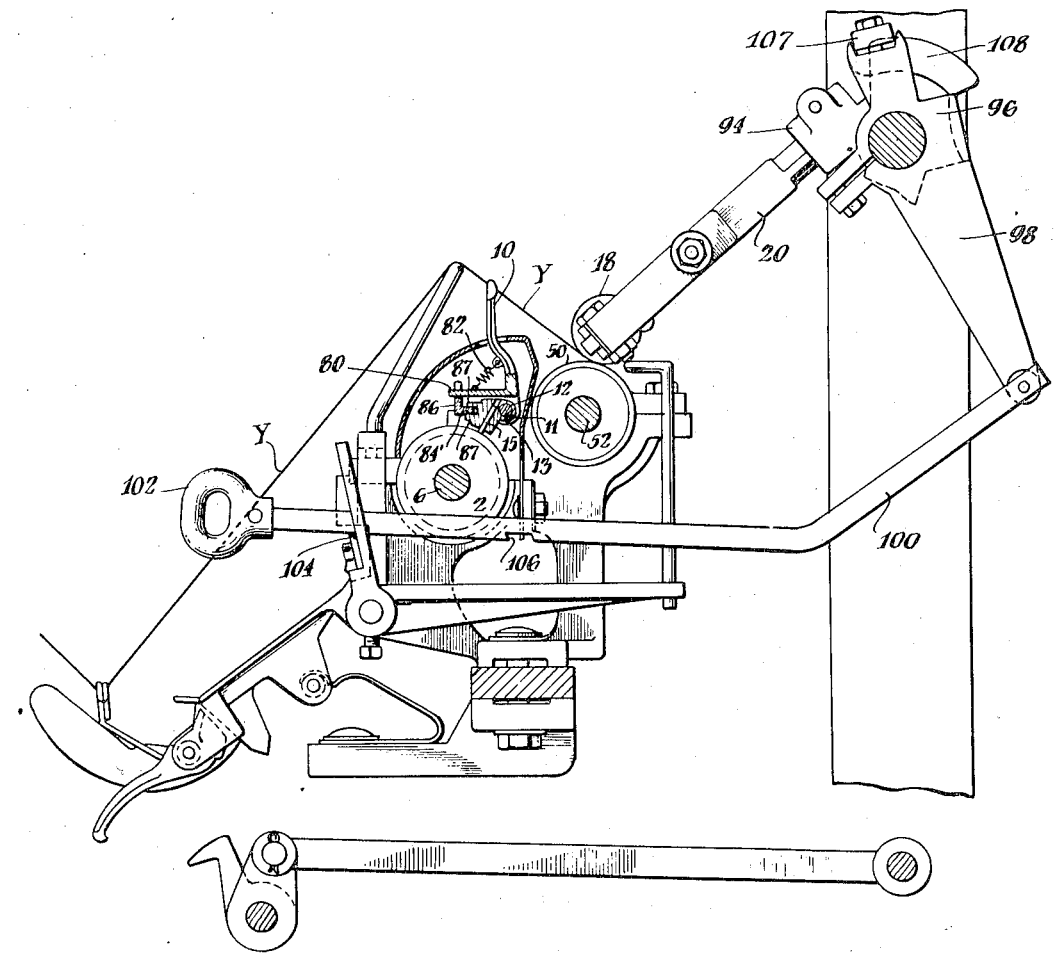
Figure 2 is a cross section on the broken line 2—2 of Figure 1, looking in the direction of the arrows.
Figure 9:
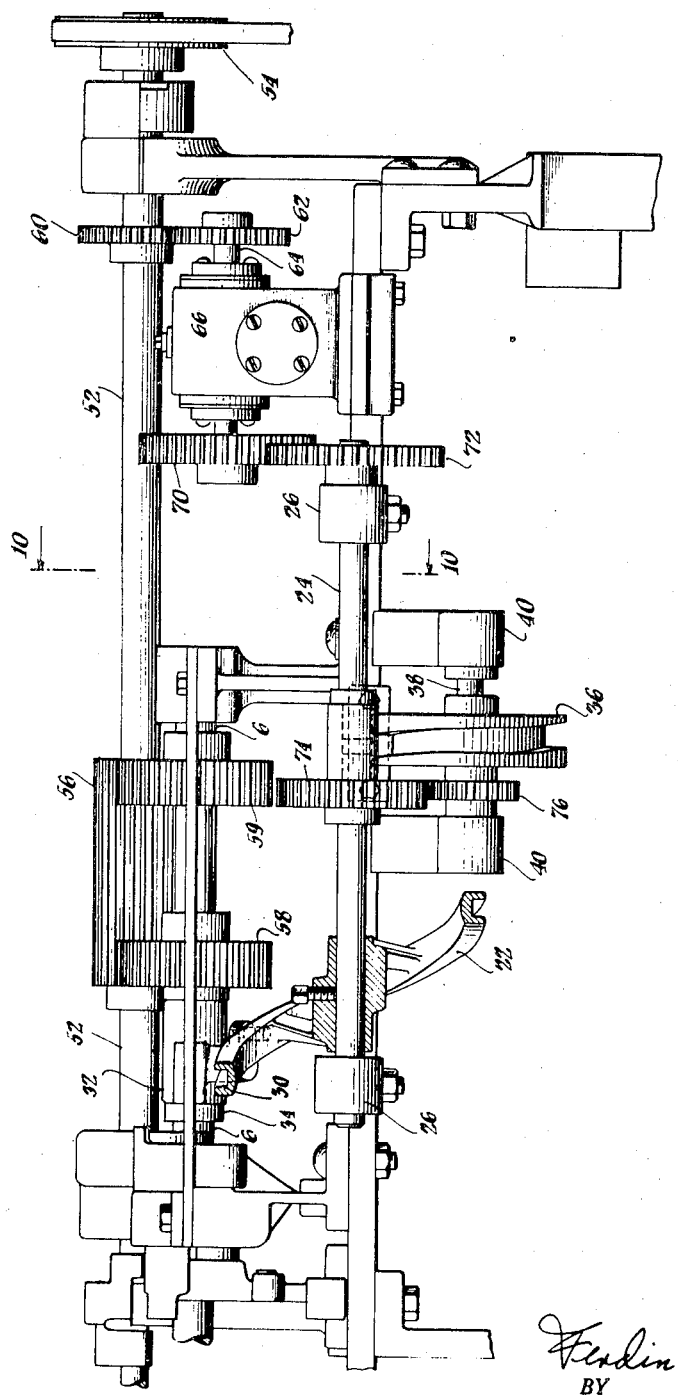
Figure 9 is a side elevation of that portion of the machine, further to the right of the portion shown in Figure 1.

When it is desirable or necessary to remove the yarn package from its peripheral contact with driving roll 50, the arm 100 is moved forwardly and latched by tooth 104 and through the bell crank structure shown particularly on Figure 2, the package is raised upwardly, as shown in dotted lines.

*Tension control*

One of the important features of this invention is that as the yarn guide moves toward the ends of the package, the drag applied to the yarn is progressively increased, so as to prevent any slack occurring in the yarn by reason of the slower travel of the yarn when winding on the package ends which are of smaller diameter than the central portion of the package, a feature of particular value in connection with the winding of "nylon," where bothersome loops are apt to form at the ends of the package. The additional drag supplied by this invention holds any such coils and loops firmly in place, as formed.

Referring now to Figure 12, one form of tension control is there illustrated and comprises a supporting plate 110 on which is mounted a pair of pins 112. A pair of washers 114 rest loosely on each of these pins so as to subject the yarn Y when sandwiched between the washers, to a frictional drag, thereby increasing the tension on the yarn. The yarn from the skein, pirn or other supply passes over a guide tension finger 116 and when in the center position does not engage with either pair of friction washers. However, as the yarn guide 10 moves toward one end of the package or the other, it goes between either the right-hand or left-hand pair of washers, according to its direction of movement, and as it moves further to the right or left, is subjected to a progressively increasing drag, because it is engaged by more and more of the washer surfaces. Conversely, as the yarn guide comes back to the center position, it gradually disengages from between the washers, thereby decreasing the drag. Additional washers may be put on pins 112, or heavier washers used, for increasing the drag.

Referring to Figure 13, the yarn may be led through a pigtail 118. A plate 120 is provided with a series of friction washers 114' mounted on pins 112' which act in the same way as 114 and 112 in Figure 12. In Figure 13, four sets of such washers are shown on each side. When the yarn is in the center position, it does not engage any set of washers and then, as it is moved to the right or left, it first engages the lowermost set and as it continues to move toward the end of the package, it successively engages successive sets of washers and also threads itself more deeply in between the sets of washers first engaged, thereby successively increasing the drag as the yarn guide moves toward either end of the package and successively decreasing the tension as it comes back toward the middle.

Referring to Figure 14, another way of increasing the drag is there shown, this form comprising a pair of drag wires 122 carried by a drag finger 124, these wires being placed at an angle of about 45° to the central position of the yarn Y, the yarn taking a zig-zag path around finger 124 and one of the wires 122. Due to the angular arrangement of the wires, the drag on the yarn gradually increases as the yarn moves toward the ends of the package, due to the increase in the zig-zag band; the drag decreases when it moves in the opposite direction.

Another way of increasing the drag is shown in Figure 17 where a supporting plate 126 is provided with lower tension bar 128 and an upper drag bar 130, both of which are of light spring metal. The upper bar is pressed lightly against the lower bar by a manually operable adjusting screw 132, which may bear directly on the upper bar, or may bear on a spring which bears on the upper bar. When the yarn is in the central position, it does not engage either plate 128 or 130. As the yarn guide moves toward the ends of the package, the yarn slips in between the tension bars, and as it gradually moves closer to the drag screw 132, the drag is increased, thereby increasing the drag as the yarn approaches the end of the package; when the yarn comes back, the drag is progressively decreased.

Angularity of lay of the coils

The movement of the yarn guide 10 is the resultant of the combined effect of the primary or traverse cam 2, the first auxiliary cam 22 and the second auxiliary cam 36.

Figure 18 shows diagrammatically the throw of the primary cam by itself. Figure 19 shows diagrammatically the throw of the first auxiliary cam, and Figure 20 shows diagrammatically the throw of the second auxiliary cam.

These three cams are intergeared for simultaneous operation, as has been described, and the yarn guide follows a path which is the resultant of the three cam control and will be such that the angularity of the lay between the coils progressively increases from the center toward either end.

Operation of the machine

To summarize the operation: With the core 18 in contact with the driving roll 50, as in Figure 2, and the yarn from the yarn guide led through one of the several tension-increasing means shown in Figures 12-17, the yarn guide 10, under the influence of the three cams 2, 22 and 36, moves back and forth in a continuously varying and non-repeating path. As the yarn guide moves back and forth, it is also rocked back and forth, toward and away from the core, due to the engagement of the arm 80 of the yarn guide with the forming guide 84. As the package gradually builds up, the diameter of the coil increases at the central portion of the package. During the winding, the linear speed of the strand winding on the central portion of the package gradually increases, but remains at a low and substantially constant speed for the winding of the yarn at the ends of the package. As the yarn guide moves back and forth, the linear speed of the yarn progressively increases from one end of the package to the center of the package and then progressively decreases until the other end of the package is reached (excepting only the initial traverses of the yarn guide when the package is all of a uniform diameter). On the reverse traverse movement the yarn speed likewise increases to the center of the package and then diminishes to the end of the package.

At the start of the winding operation, the lineal speed of the yarn is uniform; as the package increases in diameter at its middle portion, the lineal speed is maintained about the same at the middle, while there is a decrease in lineal speed of the yarn as the yarn approaches the ends of the package, where the diameter is smaller.

The diameter of the package gradually increases during the winding. A partially wound package is shown in Figure 6 at 130, while a full package is shown in Figure 7 at 130'. The finished package has tapered ends and is substantially in the shape of a double truncated ellipsoid. As has already been pointed out, the total cycle of movement of the yarn guide 10 is such that it takes longer to complete the cycle than to wind a completed package so that "ribbon-wind" is avoided, which is due to too short a cycle for the yarn guide.

The machine of this invention therefore produces a yarn package which has been found particularly efficient in packaging "Nylon" or the like, where the end coils are bound firmly in place by the increased drag applied thereto during the winding and where the lay of the coils is such that the yarn unwinds very readily from the package without catching.

The invention in its broader aspects is not limited to the specific mechanisms shown and described but departures may be made therefrom within the scope of the accompanying claims without departing from the principles of the invention and without sacrificing its chief advantages.

What I claim is:

1. A yarn winding machine for winding a package which gradually tapers toward its ends, comprising a yarn guide, traversing means for moving said yarn guide back and forth, having a stroke less than the overall length of the yarn package, a first auxiliary means for moving said traversing means in a direction longitudinally of the package for increasing the travel of the yarn guide, and a second auxiliary means acting on said first auxiliary means for continuously varying the effect of the first auxiliary means on said traversing means.

2. A yarn winding machine for winding a package which gradually tapers toward its ends, comprising a support for the package core, means for rotating said support, traversing means for moving said yarn guide back and forth, having a stroke less than the overall length of the yarn package, a first auxiliary means for moving said traversing means in a direction longitudinally of the package for increasing the travel of the yarn guide, and a second auxiliary means acting on said first auxiliary means for continuously varying the effect of the first auxiliary means on said traversing means, said core support rotating means, said traversing means and said first and second auxiliary means being intergeared for simultaneous rotary operation at predetermined relative speeds.

3. A yarn winding machine for winding a package which gradually tapers toward its ends, comprising a yarn guide, traversing means for moving said yarn guide back and forth, having a stroke less than the overall length of the yarn package, a first auxiliary means for moving said traversing means in a direction longitudinally of the package for increasing the travel of the yarn guide, a second auxiliary means acting on said first auxiliary means for continuously varying the effect of the first auxiliary means on said traversing means, and a forming guide extending in a direction longitudinally of the package and cooperating with said yarn guide and acting to move the yarn guide towards the axis of the package as the yarn guide moves towards the ends of the package.

4. A yarn winding machine for winding a package which gradually tapers toward its ends, comprising a support for the package core, means for rotating said support, a yarn guide, traversing means for moving said yarn guide back and forth, having a stroke less than the overall length of the yarn package, a first auxiliary means for moving said traversing means in a direction longitudinally of the package for increasing the travel of the yarn guide, a second auxiliary means acting on said first auxiliary means for continuously varying the effect of the first auxiliary means on said traversing means, said core support rotating means, said traversing means and said first and second auxiliary means being intergeared for simultaneous rotary operation at predetermined relative speeds, and a forming guide extending in a direction longitudinally of the package and cooperating with said yarn guide and acting to move the yarn guide towards the axis of the package as the yarn guide moves towards the ends of the package.

5. In a yarn winding machine, the combination of a yarn guide for feeding yarn to a rotating core, a primary traverse cam for moving the yarn guide back and forth in a path less than the overall length of the yarn package, a first auxiliary cam for bodily moving the primary cam back and forth longitudinally of the yarn package, for increasing the effective path of travel of the yarn guide, and a second auxiliary cam for bodily moving the first auxiliary cam back and forth for varying the effective throw of the first auxiliary cam.

6. In a yarn winding machine, the combination of a yarn guide for feeding yarn to a rotating core, a core support, surface drive means for rotating said support, a primary traverse cam for moving the yarn guide back and forth in a path less than the overall length of the yarn package, a first auxiliary cam for bodily moving the primary cam back and forth longitudinally of the yarn package, for increasing the effective path of travel of the yarn guide, and a second auxiliary cam for bodily moving the first auxiliary cam back and forth for varying the effective throw of the first auxiliary cam, said surface drive means and all of said cams being geared together for rotary operation at predetermined relative speeds.

7. In a yarn winding machine, the combination of a yarn guide for feeding yarn to a rotating core, a primary traverse cam for moving the yarn guide back and forth in a path less than the overall length of the yarn package, a first auxiliary cam for bodily moving the primary cam back and forth longitudinally of the yarn package, for increasing the effective path of travel of the yarn guide, a second auxiliary cam for bodily moving the first auxiliary cam back and forth for varying the effective throw of the first auxiliary cam, and a forming guide extending in a direction longitudinally of the package and cooperating with said yarn guide and acting to move the yarn guide towards the axis of the package as the yarn guide moves towards the ends of the package.

8. In a yarn winding machine, the combination of a yarn guide, a support for the package core, surface drive means for rotating said support, a primary traverse cam for moving the yarn guide back and forth in a path less than the overall length of the yarn package, a first auxiliary cam for bodily moving the primary cam back and forth longitudinally of the yarn package, for increasing the effective path of travel of the yarn guide, a second auxiliary cam for bodily moving the first auxiliary cam back and forth for varying the effective throw of the first auxiliary cam, said support rotating means and all of said cams being geared together for rotary operation at predetermined relative speeds, and a forming guide extending in a direction longitudinally of the package and cooperating with said yarn guide and acting to move the yarn guide towards the axis of the package as the yarn guide moves towards the ends of the package.

9. A yarn winding machine for winding a package which gradually tapers toward its ends, comprising a yarn guide, traversing means for moving said yarn guide back and forth, having a stroke less than the overall length of the yarn package, a first auxiliary means for moving said traversing means in a direction longitudinally of the package for increasing the travel of the yarn guide, a second auxiliary means acting on said first auxiliary means for continuously varying the effect of the first auxiliary means on said traversing means, and means for increasing the drag on the yarn as the yarn guide approaches the end of each traverse stroke.

10. A yarn winding machine for winding a package which gradually tapers toward its ends, comprising a support for the package core, means for rotating said support, a yarn guide, traversing means for moving said yarn guide back and forth, having a stroke less than the overall length of the yarn package, a first auxiliary means for moving said traversing means in a direction longitudinally of the package for increasing the travel of the yarn guide, and a second auxiliary means acting on said first auxiliary means for continuously varying the effect of the first auxiliary means on said traversing means, said support rotating means, said traversing means, and said first and second auxiliary means being intergeared for simultaneous rotary operation at predetermined relative speeds, and means for increasing the drag on the yarn as the yarn guide moves in either direction from its mid point of travel, and for decreasing the drag as the yarn guide moves toward such mid point.

11. A yarn winding machine for winding a package which gradually tapers toward its ends, comprising a yarn guide, traversing means for moving said yarn guide back and forth, having a stroke less than the overall length of the yarn package, a first auxiliary means for moving said traversing means in a direction longitudinally of the package for increasing the travel of the yarn guide, a second auxiliary means acting on said first auxiliary means for continuously varying the effect of the first auxiliary means on said traversing means, a forming guide extending in a direction longitudinally of the package and cooperating with said yarn guide and acting to move the yarn guide towards the axis of the package as the yarn guide moves towards the ends of the package, and means for increasing the drag on the yarn as the yarn guide approaches the end of each traverse stroke.

12. A yarn winding machine for winding a package which gradually tapers toward its ends, comprising a support for the package core, means for rotating said support, a yarn guide, traversing means for moving said yarn guide back and forth, having a stroke less than the overall length of the yarn package, a first auxiliary means for moving said traversing means in a direction longitudinally of the package for increasing the travel of the yarn guide, a second auxiliary means acting on said first auxiliary means for continuously varying the effect of the first auxiliary means on said traversing means, said support rotating means, said traversing means and said first and second auxiliary means being intergeared for simultaneous rotary operation at predetermined relative speeds, a forming guide extending in a direction longitudinally of the package and cooperating with said yarn guide and acting to move the yarn guide towards the axis of the package as the yarn guide moves towards the ends of the package, and means for increasing the drag on the yarn as the yarn guide moves in either direction from its mid point of travel, and for decreasing the drag as the yarn guide moves toward such mid point.

13. In a yarn winding machine, the combination of a yarn guide for feeding yarn to a rotating core, a primary traversing cam for moving the yarn guide back and forth in a path less than the overall length of the yarn package, a first auxiliary cam for bodily moving the primary cam back and forth longitudinally of the yarn package, for increasing the effective path of travel of the yarn guide, a second auxiliary cam for bodily moving the first auxiliary cam back and forth for varying the effective throw of the first auxiliary cam, and means for increasing the drag on the yarn as the yarn guide approaches the end of each traverse stroke.

14. In a yarn winding machine, the combination of a yarn guide, a support for the package core, surface drive means for rotating said support, a primary traverse cam for moving the yarn guide back and forth in a path less than the overall length of the yarn package, a first auxiliary cam for bodily moving the primary cam back and forth longitudinally of the yarn package, for increasing the effective path of travel of the yarn guide, a second auxiliary cam for bodily moving the first auxiliary cam back and forth for varying the effective throw of the first auxiliary cam, said support rotating means and all of said cams being geared together for rotary operation at predetermined relative speeds, and means for increasing the drag on the yarn as the yarn guide moves in either direction from its mid point of travel, and for decreasing the drag as the yarn guide moves toward such mid point.

15. In a yarn winding machine, the combination of a yarn guide for feeding yarn to a rotating core, a primary traverse cam for moving the yarn guide back and forth in a path less than the overall length of the yarn package, a first auxiliary cam for bodily moving the primary cam back and forth longitudinally of the yarn package, for increasing the effective path of travel of the yarn guide, a second auxiliary cam for bodily moving the first auxiliary cam back and forth for varying the effective throw of the first auxiliary cam, a forming guide extending in a direction longitudinally of the package and cooperating with said yarn guide and acting to move the yarn guide towards the axis of the package as the yarn guide moves towards the ends of the package, and means for increasing the drag on the yarn as the yarn guide approaches the end of each traverse stroke.

16. In a yarn winding machine, the combination of a yarn guide, a support for the package core, surface drive means for rotating said support, a primary traverse cam for moving the yarn guide back and forth in a path less than the overall length of the yarn package, a first auxiliary cam for bodily moving the primary cam back and forth longitudinally of the yarn package, for increasing the effective path of travel of the yarn guide, a second auxiliary cam for bodily moving the first auxiliary cam back and forth for varying the effective throw of the first auxiliary cam, said support rotating means and all of said cams being geared together for rotary operation at predetermined relative speeds, a forming guide extending in a direction longitudinally of the package and cooperating with said yarn guide and acting to move the yarn guide towards the axis of the package as the yarn guide moves towards the ends of the package, and means for increasing the drag on the yarn as the yarn guide moves in either direction from its mid point of travel, and for decreasing the drag as the yarn guide moves toward such mid point.

17. A yarn winding machine for winding a package which gradually tapers toward its ends, comprising roll means bearing against the surface of the package as it forms, for rotating it, a yarn guide, traversing means for moving said yarn guide back and forth, having a stroke less than the overall length of the yarn package, a first auxiliary means for moving said traversing means in a direction longitudinally of the package for increasing the travel of the yarn guide, and a second auxiliary means acting on said first auxiliary means for continuously varying the effect of the first auxiliary means on said traversing means, said roll means, said traversing means and said first and second auxiliary means being geared together for simultaneous rotary operation at predetermined relative speeds.

18. In a yarn winding machine, the combination of a yarn guide for feeding yarn to a rotating core, a roll means bearing against the surface of the package as it forms, for rotating it, a primary traverse cam for moving the yarn guide back and forth in a path less than the overall length of the yarn package, a first auxiliary cam for bodily moving the primary cam back and forth longitudinally of the yarn package, for increasing the effective path of travel of the yarn guide, a second auxiliary cam for bodily moving the first auxiliary cam back and forth for varying the effective throw of the first auxiliary cam, said roll means and all of said cams being geared together for rotary operation at predetermined relative speeds.

19. A yarn winding machine for winding a package which gradually tapers toward its ends, comprising a yarn guide, traversing means for moving said yarn guide back and forth, having a stroke less than the overall length of the yarn package, a first auxiliary means for moving said traversing means in a direction longitudinally of the package, for increasing the travel of the yarn guide, a second auxiliary means acting on said first auxiliary means for continuously varying the effect of the first auxiliary means on said traversing means, a forming guide extending in a direction longitudinally of the package, and cooperating with said yarn guide and acting to move said yarn guide towards the axis of the package as the yarn guide moves toward the ends of the package, roll means bearing against the surface of the package for rotating it, said traversing means, said first and second auxiliary means and said roll means being geared together for simultaneous rotary operation at fixed relative speeds, and means for increasing the drag on the yarn as the yarn guide moves in either direction from its mid point of travel.

20. In a yarn winding machine, the combination of a yarn guide, a primary traverse cam for moving the yarn guide back and forth in a path less than the overall length of the yarn package, a first auxiliary cam for bodily moving the primary cam back and forth longitudinally of the package, for increasing the effective path of travel of the yarn guide, a second auxiliary cam for bodily moving the first auxiliary cam back and forth for varying the effective throw of the first auxiliary cam, roll means bearing against the surface of the package as it forms, for rotating it, said three cams and said roll means being intergeared for rotary operation at predetermined relative speeds, a forming guide extending in a direction longitudinally of the package and cooperating with said yarn guide and acting to move said yarn guide towards the axis of the package as the yarn guide moves towards the ends of the package, and means for increasing the drag on the yarn as the yarn guide moves in either direction from its mid point of travel, and for decreasing the drag as the yarn guide moves toward such mid point.

21. In a yarn winding machine for winding a package which tapers toward its ends, a yarn guide, means for moving the yarn guide back and forth in a path parallel to the axis of the package, and means for simultaneously rocking the yarn guide to and from the axis of the package about an axis parallel to the axis of the package.

22. In a yarn winding machine for winding a package which tapers toward its ends, a yarn guide, means for moving the yarn guide back and forth longitudinally of the package, and means for simultaneously rocking the yarn guide about an axis parallel to the axis of the package, to thereby follow a path which is closest to the package at the ends of its stroke, and is curved away from the middle of the package.

23. In a yarn winding machine for winding a package which tapers toward its ends, a yarn guide, means for moving the yarn guide back and forth in a path wherein the yarn guide is closest to the package at either end of its travel, and is farthest away from the package when adjacent the middle of the package, and means for increasing the drag on the yarn as the yarn guide moves from its mid point of travel toward either end thereof.

24. In a yarn winding machine for winding a package which tapers toward its ends, a yarn guide, means for moving the yarn guide back and forth in an arcuate path which is closest to the package at the ends of its stroke, and is curved away from the middle of the package, and means for increasing the drag on the yarn as the yarn guide moves from the middle of the package toward either end, and for decreasing the drag as it moves from the ends toward the middle of the package.

25. In a yarn winding machine, a yarn guide, a primary traverse cam for moving the yarn guide back and forth, a first auxiliary cam for bodily moving the traverse cam back and forth longitudinally of the package, and a second auxiliary cam for moving the first auxiliary cam back and forth longitudinally of the package, said second auxiliary cam acting to lengthen the cycle of operation of the first auxiliary cam for avoiding repetition of the winding cycle and so preventing "ribbon-wind."

26. In a yarn winding machine, a yarn guide, a primary traverse cam for moving the yarn guide back and forth, a first auxiliary cam for bodily moving the traverse cam back and forth longitudinally of the package, a second auxiliary cam for moving the first auxiliary cam back and forth longitudinally of the package, said second auxiliary cam acting to lengthen the cycle of operation of the first auxiliary cam for avoiding repetition of the winding cycle and so preventing "ribbon-wind," and means for increasing the drag on the yarn as the yarn guide approaches the end of its travel in either direction.

27. In a yarn winding machine, a yarn guide, a primary traverse cam for moving the yarn guide back and forth, a first auxiliary cam for bodily moving the traverse cam back and forth longitudinally of the package, a second auxiliary cam for moving the first auxiliary cam back and forth longitudinally of the package, said second auxiliary cam acting to lengthen the cycle of operation of the first auxiliary cam for avoiding repetition of the winding cycle and so preventing "ribbon-wind," and a forming guide extending in a direction longitudinally of the package and cooperating with said yarn guide and acting to move the yarn guide towards the axis of the package as the yarn guide moves towards the ends of the package.

28. In a yarn winding machine, a yarn guide, a primary traverse cam for moving the yarn guide back and forth, a first auxiliary cam for bodily moving the traverse cam back and forth longitudinally of the package, a second auxiliary cam for moving the first auxiliary cam back and forth longitudinally of the package, said second auxiliary cam acting to lengthen the cycle of operation of the first auxiliary cam for avoiding repetition of the winding cycle and so preventing "ribbon-wind," and means for increasing the drag on the yarn as the yarn guide approaches the end of its travel in either direction, a forming guide extending in a direction longitudinally of the package and cooperating with said yarn guide and acting to move the yarn guide towards the axis of the package as the yarn guide moves towards the ends of the package.

29. In a yarn winding machine, a yarn guide, and means for moving the yarn guide progressively nearer the package core as it moves toward the ends of the package, for thereby progressively increasing the angularity of lay of the coils from the middle, said means including means for varying the rate of increase of travel of the yarn for thereby varying the rate of increase of the angular lay of the coils at different depths in the package.

30. In a yarn winding machine, a yarn guide, means for moving the yarn guide back and forth longitudinally of the package, means for progressively increasing the drag on the yarn as the yarn guide approaches the ends of the yarn package, and means, cooperating with said yarn guide, for progressively increasing the angularity of lay of the coils of the package as the yarn guide approaches the ends of the package.

31. As a new article of manufacture, a yarn package which has its maximum diameter at the middle thereof, and wherein the angularity of lay, and the drag of the coils both progressively increase from the middle of the package toward the ends thereof.

32. As a new article of manufacture, a yarn package wherein the angularity of lay of the coils progressively increases from the middle of the package towards its ends, wherein said increase in the angular lay of the coils varies at different depths in the package, and wherein the tension on the coils over the length of the package is substantially constant.

33. The method of winding a yarn package, comprising the steps of progressively and simultaneously increasing the angularity of the lay between successive coils, and the drag on the yarn, as the coils are applied from the middle of the package outwardly toward its ends.

34. The method of winding a yarn package, comprising the steps of increasing the angularity of the lay between successive coils from the middle of the package outwardly toward its ends, simultaneously varying the rate of said increase of the angular lay at different times during the winding, and also simultaneously progressively increasing the drag on the yarn as the coils are wound from the middle of the package outwardly toward its ends.

35. A tension control for a yarn winding machine in which the yarn is traversed along the surface of a rotating package providing a normal central free path for the yarn, and a pair of drag creating means, one at either side of the central path, and progressively engageable with the yarn as it is traversed from said central path to progressively increase the drag on the yarn as the departure of the yarn from the central path increases.

36. A tension control for a yarn winding machine in which the yarn is traversed along the surface of a rotating package providing a normal central free path for the yarn, and a pair of drag creating means, one at either side of the central path, and progressively engageable with the yarn as it is traversed from said central path to progressively increase the drag on the yarn as the departure of the yarn from the central path increases each of said drag creating means including a pair of members between which the yarn may be threaded to varying degrees.

37. A tension control for a yarn winding machine in which the yarn is traversed along the surface of a rotating package providing a normal central free path for the yarn, and a pair of drag creating means, one at either side of the central path, and progressively engageable with the yarn as it is traversed from said central path to progressively increase the drag on the yarn as the departure of the yarn from the central path increases each of said drag creating means including a pair of members between which the yarn may be threaded to varying degrees one of said members being lightly pressed towards the other in each pair.

FERDINAND F. STANGE.